US005689287A

United States Patent [19]

Mackinlay et al.

[11] Patent Number: 5,689,287
[45] Date of Patent: Nov. 18, 1997

[54] CONTEXT-PRESERVING DISPLAY SYSTEM USING A PERSPECTIVE SHEET

[75] Inventors: Jock D. Mackinlay, Palo Alto; George G. Robertson, Foster City, both of Calif.

[73] Assignee: Xerox Corporation, Stamford, Conn.

[21] Appl. No.: 589,433

[22] Filed: Jan. 22, 1996

Related U.S. Application Data

[63] Continuation of Ser. No. 144,238, Oct. 27, 1993, abandoned.
[51] Int. Cl.⁶ ................................................ G06T 15/00
[52] U.S. Cl. ........................................... 345/427; 345/433
[58] Field of Search .......................... 395/118–119, 127, 395/157–159, 133

[56] References Cited

U.S. PATENT DOCUMENTS

| | | | |
|---|---|---|---|
| 4,790,028 | 12/1988 | Ramage | 382/47 |
| 4,800,379 | 1/1989 | Yeomans | 340/731 |
| 4,885,702 | 12/1989 | Ohba | 364/521 |
| 5,303,388 | 4/1994 | Kreitman et al. | 395/159 |
| 5,339,350 | 8/1994 | Robertson et al. | 395/157 |
| 5,339,390 | 8/1994 | Robertson et al. | 395/157 |
| 5,341,466 | 8/1994 | Perlin et al. | 395/139 |

FOREIGN PATENT DOCUMENTS

| | | |
|---|---|---|
| 0 399 663 | 11/1990 | European Pat. Off. . |
| 2 139 846 | 11/1984 | United Kingdom . |

OTHER PUBLICATIONS

MacKinlay, Jock D. et al, "The Perspective Wall: Detail and Context Smoothly Integrated", *Proceeding of the ACM SIGCHI Conference on Human Factors in Computing Systems, ACM Apr. 1991*, pp. 1–8.

Sarkar, Manojit, et al., *Graphical Fisheye Views of Graphs*, CHI, 1992 (Monterey, CA, May 3–May 7, 1992), ACM, New York, 1992. pp. 23–35.

Brown, Marc H., et al., *Graphical Fisheye Views of Graphs 84b (Videotape)*, Digital Research Center Reports, Jul. 1, 1992.

Peterson, S.P., et al., "Human Factors in Computing Systems Reaching Through Technology", *CHI'91 Conference Proceedings*, New Orleans, LA, pp. 173–179, Apr. 27–May 2, 1991.

Furnas, Generalized Fisheye Views, CHI (1986) Proceedings ACM, Apr. 1986 pp. 16–23.

*Primary Examiner*—Heather R. Herndon
*Assistant Examiner*—Rudolph Buchel
*Attorney, Agent, or Firm*—Philip H. Albert; Townsend and Townsend and Crew

[57] ABSTRACT

A substitute image is generated by dividing a full image into panels defined by a center (or focus) panel, for use in applications where the full image is not entirely displayable on a given display device at a necessary resolution. The full image is bounded by a bounding rectangle, the focus panel is a rectangle with sides parallel to the sides of the bounding rectangle, and the focus panel defines eight other panels, four side panels and four corner panels. The substitute image is the focus panel, with the side panels folded into a smaller cross section, but remaining continuous with the focus panel, and the corner panels folded and sheared to remain continuous with the side panels in a three-dimensional ("3D") space in which a viewpoint and a view plane representing the display surface is also located. To focus on an area of the image which is not under the focus panel, the viewer selects a point in the area of interest, and the display system moves the image so that the selected point is under the focus panel.

9 Claims, 5 Drawing Sheets

CONTEXT-PRESERVING DISPLAY SYSTEM USING A PERSPECTIVE SHEET

This is a Continuation of application Ser. No. 08/144,238, filed Oct. 27, 1993, now abandoned.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

CROSS REFERENCE TO RELATED APPLICATIONS

A related application in the field of visual displays of information, U.S. application Ser. No. 08/143,323, filed Oct. 26, 1993 entitled "IMAGE LENS" is assigned to the same assignee as the present application, and is incorporated herein by reference for all purposes.

BACKGROUND OF THE INVENTION

The present invention relates to the field of visual displays of information. More specifically, the invention solves the problem of presenting an image which cannot be displayed at full resolution on a display device without total loss of either details or context information.

An image is a visual display of information, or a logical representation of what is to become a visual display of information. One type of image is a text image. The information content of a text image is in the text of the image, but is also in the placement of the text in the image. For an image to be useful to a viewer, it must be displayed on a display device in such a way that the information content can be conveyed to the viewer. If the entire image can be displayed on the display device at the full resolution of the image, then no information is lost. However, information is often lost where a choice must be made between showing only a portion of the image at a minimum resolution which still allows the details to be seen, or showing the entire image at a resolution which shows the global patterns of the image but loses the details. Significant loss of detail in a text image would make the text unreadable.

The resolution limitations of a display could either be due to the fineness of the display or the ability of the viewer to see fine features. For example, if two lines cannot be resolved into two lines on a pixelated display device, they will appear as a single line. The merger of the lines could be due to either the inability of the display to use separate pixels for the two lines or the inability of a viewer to see the separate pixels of the two lines.

The image, when it is to be displayed on a display system such as a pixelated computer monitor, is usually stored in a digital computer as a collection of objects in a form understandable by a display system which, given an ideal display, might be displayable in their entirety. This stored form of the image, or the "full" image, by definition contains all of its information content. Examples of stored forms are bit maps (as in a low-end drawing program or photoediting system), object list files giving object characteristics and positions (as in a CAD system), vector image files, or text in the form of characters and formatting codes.

The loss of information in an image occurs when the image is to be displayed on a display which cannot display all the information of the full image. For example, if a bit map comprises more pixels than are available on the display, the display could not show the image, and a substitute image, such as a lower resolution image of the bit map or a portion of the bit map is all that can be displayed. What is displayed when a full image cannot be displayed is referred to herein as a "substitute" image.

Several systems for generating substitute images for a particular display device from a full image have been proposed. In one such system, the substitute image is a "window" into a portion (less than all) of the full image and the system provides the viewer a means for moving the window "over" the full image. Most word processors use this system. In a word processor, the typical full image is a document which is too long to be displayed on a display screen in its entirety. The substitute image provided by the word processor is a window into the document, typically 25 lines or so, and the window is moved over the document with commands such as "page down", "page up", "line down", etc.

Several word processors also include a "page view" mode, which shows how the text appears on full pages of the text document. Even with a single page document, the characters of text cannot be discriminated where the display device is a conventional computer monitor. Of course, an image of a one-page document can be fully displayed where the display device is a high resolution printer, but even a printer cannot display an image of a document of many pages in full detail.

Another type of substitute image is the split image, where one part of the displayed substitute image shows a global and less detailed view of the full image and another part of the displayed substitute image shows a detail subimage of a subregion of the full image in the necessary detail. This approach is less than desirable, since the detail subimage is detached from the global context, and consequently a viewer will need to jump back and forth visually between the global and detail images to observe both the details and the context of the information presented. In the above example of a word processor, a split image would leave a viewer of a document with no ability to read a phrase and also see where it is found in the full image.

Another split screen approach uses a substitute image which is a global image partially magnified by a magnifying glass (a physical one or one which is implemented electronically) to view details of a subimage of interest. This suffers the same problem as the previous split screen example because the connection between the global image and the detailed subimage is lost. Furthermore, with a magnifying glass, more of the global image is obscured than is shown in the magnified detail subimage.

Figure 1:
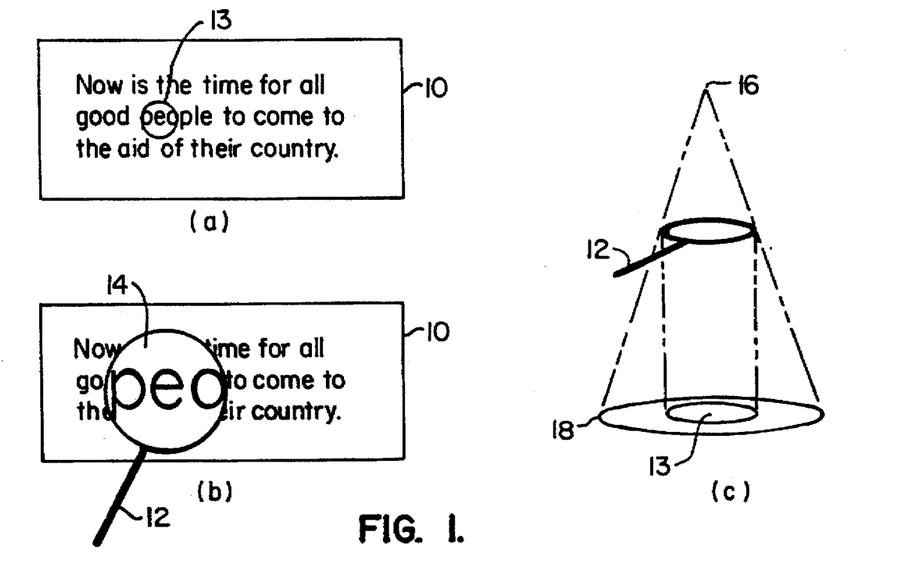
FIGS. 1a–c are illustrations of how magnification, without more, obscures portions of an image.

This magnifying glass problem is illustrated in FIG. 1. FIG. 1 shows three views of a document image 10. Although the full image 10 used in this example is actually displayable, for any practical application, the full image would contain too much text to be displayable in its display frame.

FIG. 1(b) shows the effect of magnification of a region 13 of image 10 into a detail image 14, which is effected by magnifier 12. As a result of the magnification of region 13, other areas of image 10 are obscured, and the context of detail image 14 is lost due to the discontinuity between region 13 and image 10. Note that the discontinuity occurs at the edge of magnifier 12.

The obscuring and loss of context occurs with both physical magnifiers and logical magnifiers, and the cause is shown in FIG. 1(c). FIG. 1(c) illustrates the view from a viewpoint 16 through magnifier 12 to region 13. Since magnifier 12, in effect, brings region 13 closer to viewpoint 16, the solid angle subtended by the advanced region is larger and corresponds to the bounds of an obscured region 18 in image 10.

U.S. Pat. No. 4,790,028 describes one attempt to solve the problem of magnified areas obscuring global images, by using a "variably-scaled" display. In such a display, an image is distorted such that the coordinates of an area of interest are expanded while the coordinates of the area just outside the area of interest is correspondingly compressed; the compressed portions and the remaining portions of the image are displayed with loss of information, with the loss being greater in the compressed area. However, this approach is computationally unwieldy, resulting in slow response times to viewer's magnification and movement requests. This display is also unsuitable for text images, which would be too distorted to read, within the region of interest as well as in the peripheral regions. Furthermore, such a system does not take into account the context information which may be preserved if compression is graduated from a lower compression near a detail image to a higher compression in more peripheral areas.

From the above it is seen that an improved system for fitting an image onto a display device, where both amplification of detail and context preservation of that detail within the image is needed.

SUMMARY OF THE INVENTION

An improved image display system is provided by virtue of the present invention.

In one embodiment of the present invention, a substitute image is generated by dividing a full image into panels defined by a center (or focus) panel. In a specific embodiment, the full image is bounded by a bounding rectangle, the focus panel is a rectangle with sides parallel to the sides of the bounding rectangle, and the focus panel defines eight other panels by extension of the focus panel edges to the full image edges. Of these eight panels, four are side panels adjacent to the four sides of the focus panel and four are corner panels touching corners with corners of the focus panel and each adjacent to two side panels. This substitute image is referred to as a "perspective sheet" because it is a 3D perspective view of the image mapped onto a sheet in a 3D space where the sheet covers the nine panels.

When the full image isn't displayable on a display surface of a display device, a perspective sheet is generated as the substitute image by placing the full image on a plane in a three-dimensional ("3D") space, locating a viewpoint and a view plane representing the display surface in the 3D space, folding the side panels away from the viewpoint so that they fall within the view defined by the viewpoint and the display surface on the view plane, matching the edges of the corner panels to the edges of their adjacent side panel by folding, rotating, and shearing, and then displaying the 3D perspective projection of the resulting folded 3D surface so formed on the display surface. As a definitional matter, when a panel is "folded", it is rotated in the 3D space about an axis of rotation parallel to the viewing surface, and when a panel is "rotated", it is rotated in the 3D space about an axis of rotation perpendicular to the viewing surface. In the embodiment described herein, side panels are folded along their edge adjacent to the focus panel, while corner panels are sheared to take on the angle resulting from the folding of adjacent side panels, and rotated about the vertex in common with the focus panel. The rotation is such that when the corner panel is folded, its edges which were flush with two pre-fold side panels will again be flush with those edges.

Preferably, opposing side panels (top-bottom, left-right) are folded away in the 3D space by the same angle for natural viewing, but this is not required. The side panels are either folded down enough so that they fit within the bounds of the display surface, are folded through a fixed angle or are folded by an angle specified by a viewer. The corner panels also appear to be folded naturally in the 3D space.

Typically, for natural viewing and ease of calculation, the focus panel is in a plane parallel to the view plane. In a particular embodiment, the viewpoint remains centered over the focus panel, so when the focus panel is moved over the full image, the substitute image appears to roll under a fixed focus panel. Of course, it is also possible to provide for moving the viewpoint relative to the focus panel. Because the side and corner panels are folded away from the viewpoint in the 3D space, they fit into the bounds of the display surface easier than when they are flat while still providing the necessary peripheral global view of the image when folded.

In an interactive embodiment, a viewer is provided with an input device, such as a mouse or a keyboard, to indicate which portion of the full image should fall under the focus panel, the size of the focus panel relative to the full image and the display surface bounds, the angles the side panels are folded through, and where the viewpoint is relative to the folded surface, if it is adjustable. From this information, the display system determines where the focus panel, side panels, and corner panels will appear on the display surface, what shape the side and corner panels will be, and how the full image is to be transformed to fit into those panels.

To move an new area of the full image under the focus panel, the user selects (points to) a center point of the new area. The display system responds to this selection by moving the image so that the selected center point is under the center of the focus panel. So that context is not lost in the movement, the display system can, instead of jumping to the new center point, gradually move the image into place. If the display system is set to move the image gradually, it can be set to make the gradual movement either at a constant rate or make the movement such that a movement is completed in the same time period regardless of how far the move is.

In an image processor used to manipulate the full image into the substitute image, several methods are used to ensure a quick response to viewer commands in an interactive environment. First, the amount of computation required to render a given panel is minimized. Second, objects which are not likely to appear in great detail are simplified.

One way to reduce the amount of computation in rendering a panel is to eliminate calculations on image objects which do not appear in the panel. Since the bounds of a panel on the full image are known, objects in the full image which are not within the bounds of the panel can be culled from consideration. Since the panels divide the full image horizontally and vertically, the culling and clipping of objects to the panel can often be done by comparing object positions to fold positions without additional calculations that would reduce system responsiveness.

Another way to reduce computation is to use a transformation matrix. The transformation of a full image into the substitute image involves mapping the full image onto a plane in the 3D space, delineating the panels, associating the full image with nine panel images, culling the nine panel images, clipping the panel images to the panel bounds, folding, rotating and/or shearing the panels as necessary into place in the 3D space, and then finally transforming the view of the 3D folded surface onto the 2D display surface. A transformation matrix (one per panel) is manipulated rather than the culled and clipped images. Then, when the transformation matrix between the full image and the substitute image is calculated, the full image is passed through the transformation matrix to result in the substitute image. If available, the transformations are performed with hardware especially suited to manipulating 3D graphics images.

One method of simplifying objects if the full image comprises text characters organized into lines of text and pages of lines, is to replace the lines of text with just lines, which is known as "greeking" the text.

With some text image display systems, a search capability is added where the document is searched for strings matching a search term. The matching strings are then highlighted, or otherwise distinguished. The highlights would then appear on the substitute image, so that a viewer is shown where the search terms are relative to the entire image and can move the focus panel around to view the highlighted areas in detail.

A further understanding of the nature and advantages of the inventions herein may be realized by reference to the remaining portions of the specification and the attached drawings.

DESCRIPTION OF THE PREFERRED EMBODIMENTS

Figure 2:
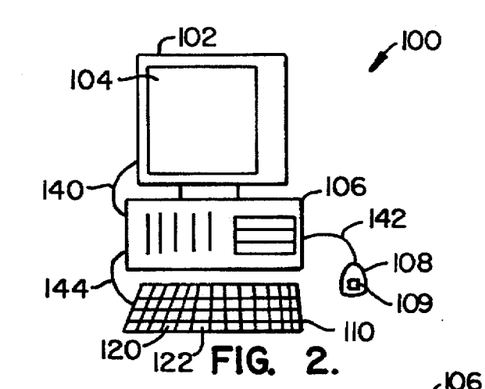
FIG. 2 is an illustration of an image display system according to one embodiment of the present invention, including an image processor.

FIG. 2 is an illustration of a display system 100 according to the present invention which is used to display full images where possible and substitute images where an image would not otherwise fit onto a display surface of the display system.

Display system 100 comprises a display 102, which has a display surface 104, an image processor 106, a mouse 108 with an interface 142 to processor 106, and a keyboard 110 with an interface 144 to processor 106. An interface 140 between display 102 and processor 106 is also shown. In a particular embodiment, display 102 is a 1280×1024 color monitor manufactured by Silicon Graphics, and image processor 106 is a Silicon Graphics Iris workstation, model 4D/420 GTX. In alternate embodiments, mouse 108 and/or keyboard 110 are replaced by other input devices.

Typically, display system 100 is part of a workstation or other general purpose computer which generates images as part of a computer application. For example, the image might be a multi-page document output by a word processing program or document database search program. The image might also be a spreadsheet of numbers, a timeline of projects and time periods, or multiple periods of accounting data. Whatever the application, display system 100 is most useful where the image output by the application is likely to be too large to be displayed by display system 100 with a resolution sufficient to make the details of the image visible. The image displayed on display surface 104 is generated by processor 106, which is discussed below in further detail.

Figure 3:
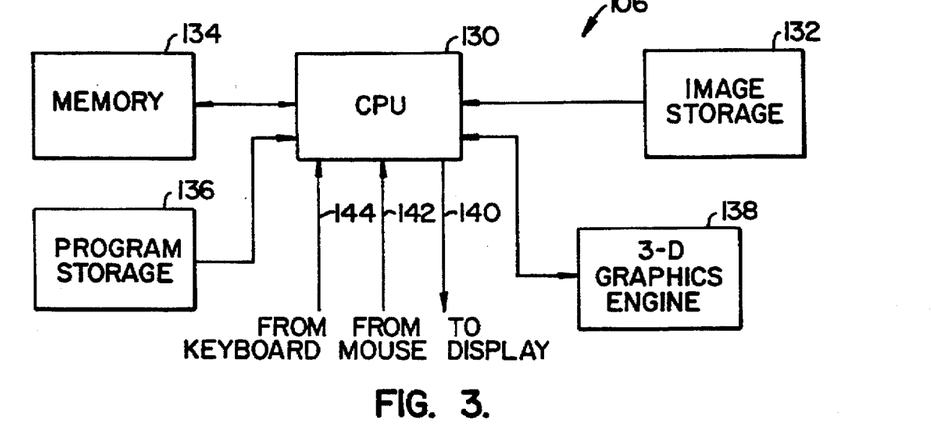
FIG. 3 is a block diagram of the image processor shown in FIG. 2.

FIG. 3 is a block diagram showing processor 106, which comprises a central processing unit (CPU) 130, image storage 132 for storing a logical representation of an image to be displayed (full image), a memory 134 for storing variables and intermediate results of CPU 130, and a program storage 136 which contains CPU instructions implementing various functions of display system 100. In some embodiments, processor 106 includes a 3D graphics engine 138. FIG. 3 also shows interface 140 (display output), interface 142 (mouse input), and interface 144 (keyboard input). Graphics engine 138 is usually implemented with a dedicated integrated circuit, such as in the Silicon Graphics Iris 4D/420 VGX.

When display system 100 is operational, CPU 130 retrieves a full image from image storage 132, and sends the necessary signals over interface 140 to display either the full image or a perspective sheet substitute image. If a substitute image is used, a transformation of the full image is generated through which the objects in the full image are passed, and then the substitute image is rendered to the characteristics of display surface 104. Otherwise, the full image is rendered to the characteristics of display surface 104. Characteristics of a display surface used in the rendering process include the number of pixels (assuming a pixelated display) in the display (height and width), and the number and range of colors displayable with a single pixel.

Figure 4:
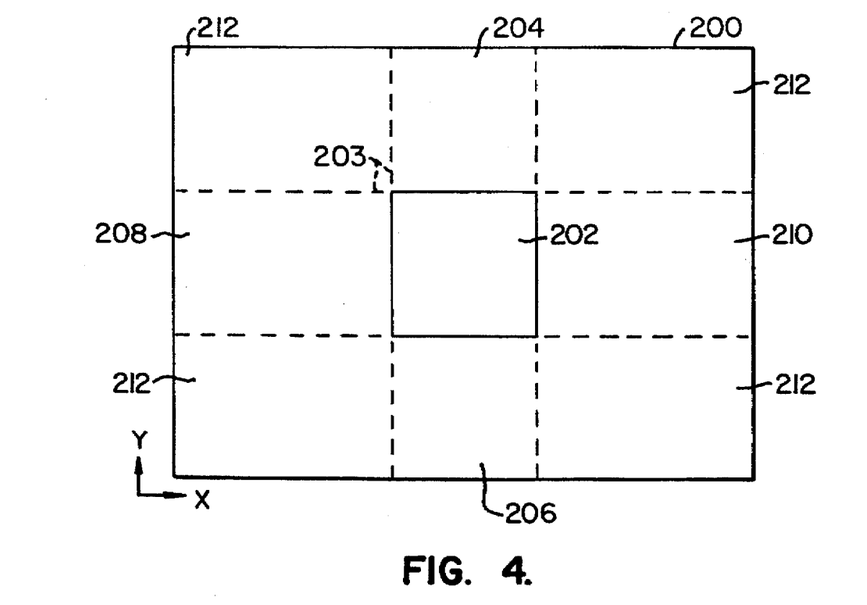
FIG. 4 is an illustration of a full image divided into panels.

FIG. 4 is a logical representation of a full image 200 stored in image storage 132 (see FIG. 3). Image 200 is rectangular, and placed thereon is a focus panel 202. The edges of focus panel 202 define extending lines, such as lines 203, which in turn define side panels and corner panels, such as a top side panel 204, a bottom side panel 206, a left side panel 208, a right side panel 210, and four corner panels 212. Note that each corner panel 212 shares one corner with focus panel 202 and shares two edges with adjacent side panels. If a display device could accommodate the full image 200 at a necessary resolution, then image 200 could be displayed as is. If not, then image 200 needs to be transformed into a substitute image which shows the necessary detail in the focus panel and preserves context information between the focus, side and corner panels while fitting them into the bounds of the display surface.

Figure 5:
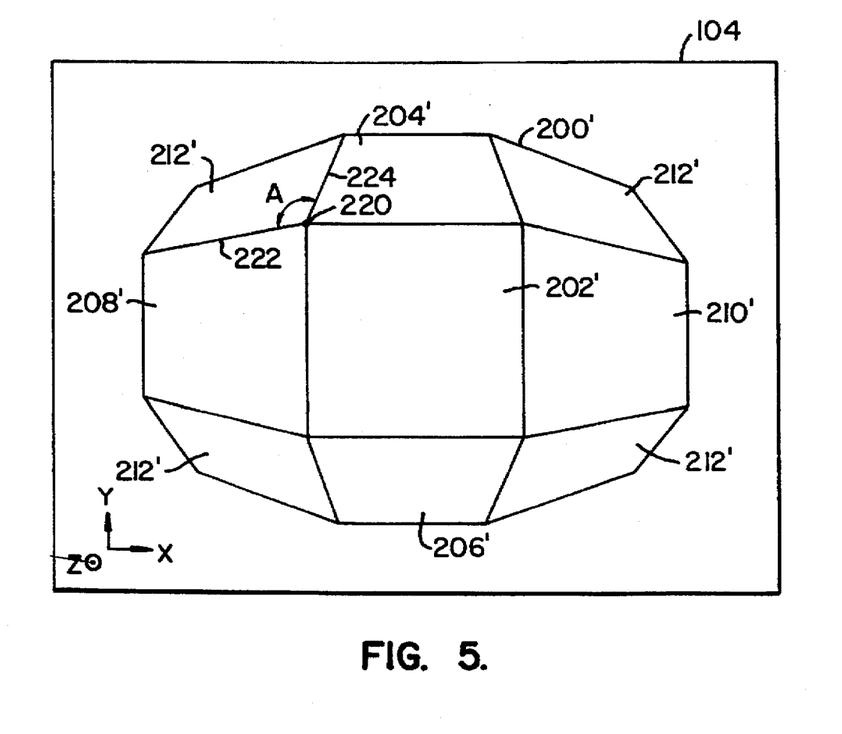
FIG. 5 is an illustration of a layout of a substitute image, in the form of a perspective sheet, displayed within the bounds of a display surface based on the division of the full image shown in FIG. 4.

FIG. 5 is a display of such a perspective sheet substitute image 200'. Image 200' comprises a focus panel 202', a top side panel 204', a bottom side panel 206', a left side panel 208', a right side panel 210' and four corner panels 212. Substitute image 200' is formed through a series of transformations in a 3D space where display surface 104 shows a perspective view of that space. The transformations are described in further detail in connection with FIG. 6.

The parameters of the transformations are derived from the 3D space placement of the viewpoint, the view plane, the bounds of the display surface mapped onto the view plane, and the focus panel, the placement of the full image within the 3D space relative to the focus panel, and the angles at which the side panels are folded. These parameters can be adjusted by a user to view details of the image simultaneously with the context information provided by the continuous image of the side and corner panels. For example, to increase the detail, the viewer might issue a command to CPU 130 to move the image closer to the focus panel, and to move around the image, the user might use the mouse to select a point on the image which is to be moved to the center of the focus panel. Typically, the focus panel is stationary and centered on the display surface (i.e., the viewpoint is centered above the focus panel), so the image appears to move under the focus panel rather than the focus panel moving over the image.

Figure 6:
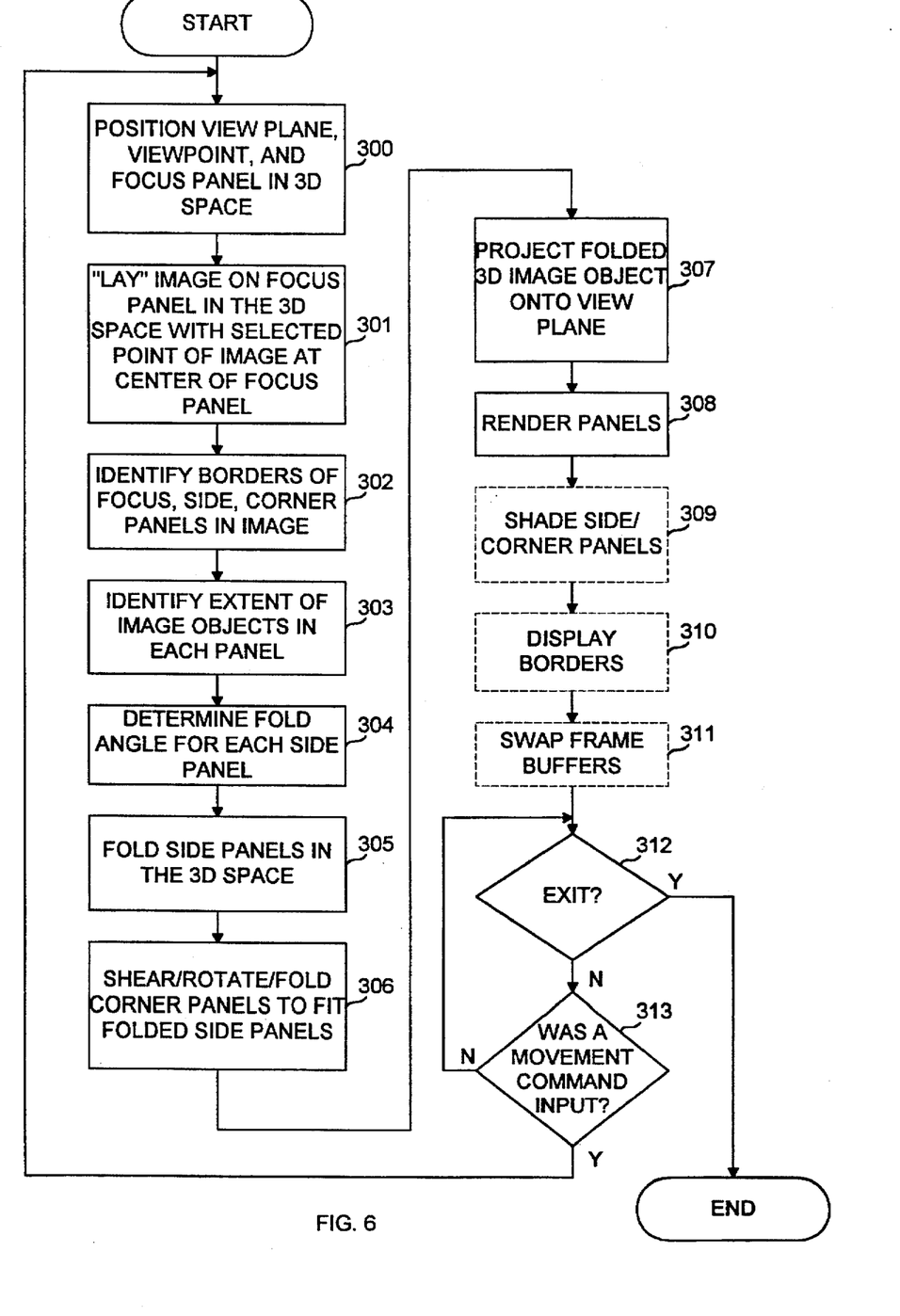
FIG. 6 is a flowchart describing a process of generating a perspective sheet substitute image according to the present invention.

FIG. 6 is a flowchart describing the high-level functions embodied in CPU program instructions stored in program storage 136 in a specific embodiment of display system 100 according to the present invention. These functions are performed by CPU 130 to generate and display substitute image 200' from image 200 stored in image storage 132. Unless otherwise indicated, the flow of the program is in block number order.

At block 300, the view plane, viewpoint, and focus panel are positioned in the 3D space. This is done by assigning values to variables reserved in memory 134 for expressing these objects' positions. In one embodiment, the viewpoint is fixed above the center of the focus panel (i.e., it has the same x-axis and y-axis coordinates) and the viewpoint has a positive z value relative to the focus panel. The view plane is initially parallel to the image and between the image and the viewpoint. At this point, the bounds of the display surface on the viewing plane are calculated if necessary.

In a specific embodiment, the coordinates of the bounds of the display surface are arbitrarily chosen to be (0, 0, 0), (x_max, 0, 0), (x_max, y_max, 0) and (0, y_max, 0), thus defining a rectangle in the positive quadrant of the z=0 plane. This is illustrated in FIG. 4. Once the viewpoint and view plane are positioned, other objects can be positioned in the 3D space and the perspective view of those other objects are determined from the position of the view plane and the portions of these other objects which are displayed, if any, are determined by the bounds of the display surface on the view plane. In a specific example, to be referenced again below, x_max=144.0 du (display units), y_max=108.0 du, the focus panel is centered on the point (72.0, 54.0, 0.0), with a width, focus_width, or 10.0 du, and a height, focus_height, of 10.0 du. The viewpoint is at (72.0, 54.0, 38.0). All coordinates in the 3D space are in display units (du), unless otherwise indicated. In some embodiments, the viewpoint, view plane, and focus panel can be moved relative to each other.

At block 301, CPU 130 positions the full image, or just a layout of the bounds of full image in the 3D space. The layout of the full image is not necessarily the full image itself, but for complex images is an easily manipulated representation of the full image. In the following example, the layout comprises borders and features of manipulated surfaces. The layout is manipulated instead of the image itself for speed, since the layout is much easier to manipulate. Once the transformations are determined, the full image can then be rendered according to the transformations done on the layout. The positioning of the layout is usually implemented by reserving variable memory in memory 134 for the coordinate triplets of the four corners of the layout. The image, or its layout, is placed in the 3D space in the same plane as the focus panel, with a selected focus point on the image aligned with the center of the focus panel.

Next, at block 302, the borders of the panels are located on the image. Initially, the image is centered on the focus panel. Once the boundaries of the focus panel on the image are known, which form the nine subimages to be applied to the focus, side and corner panels, as shown in FIG. 4. Again, this is usually implemented by setting variables reserved for this purpose to values for the corners of the panels. The positions of the four corners of the focus panel can be expressed by the four points (focus_x, focus_y, 0), (focus_x+focus_width, focus_y, 0), (focus_x+focus_width, focus_y+focus_height, 0), and (0, focus_y+focus_height, 0), respectively (i.e., focus_x and focus_y define the lower left corner of the focus panel on the image, and focus_width and focus_length define the size of the focus panel on the image. Alternately, focus_x and focus_y might define the center of the focus panel.

Next, at block 303, CPU 130 identifies where the objects in the full image appear on the various panels. If the image is that of a multi-page document, then this step might include parsing the document into lines and pages, determining how many pages are needed, and placing the pages in a two-dimensional page array. In the following example, a rectangular image and a rectangular focus panel will be assumed. Identifying which objects, pages in the above example, appear on which panels is used in step 308, where each panel is rendered.

After locating the objects in the image relative to the bounds of the panels, CPU 130 proceeds to block 304. At block 304, CPU 130 determines the fold angles for each of the side panels. In various embodiments, the fold angles are fixed, set by the viewer, calculated from the solid angle subtended from the viewpoint of the display surface, or some combination of the above. When the fold angles are variable, variables top_fold, right_fold, bottom_fold and left_fold stored in memory 134 might hold the values of these folds. The angle of the fold, as used herein, refers to the angle a folded side panel makes with the z=0 plane. Side panels are folded into the z<0 half-space so that they fit within the solid angle defined by the display surface. The angle ranges from 0 degrees (where the panel is not folded) to some angle less than 90 degrees. A fold of 90 degrees is not too useful, since the folded side panel would not be visible from the viewpoint. The side panels are rotated about the edge they have in common with the focus panel, so context and continuity are preserved across the fold.

One method of determining the fold angles is to simply set them at some angle, such as fixing the folds at 70 degrees for the top and bottom side panels and 60 degrees for the right and left side panels, for instance. Another method is to allow the viewer to input commands which change the fold angles. Yet another method is to calculate how much area is available within the display surface and fold side panels until their perspective projection fits within the display surface. For example, suppose a fold angle for the top panel is to be calculated. First, the distance from the top edge of the focus panel's projection onto the view plane to the top edge of the display surface on the view plane is measured. Next, the height of the top panel is measured. From these two values, the parameters of the focus panel and the position of the viewpoint, CPU 130 can calculate the minimum fold angle needed to bring the entire top panel into view on the display surface.

Once the fold angles for the four side panels are determined, CPU 130 proceeds to block 305. At block 305, CPU 130 folds the side panels through the fold angles. If graphics engine 138 is used, the transformation of the side panels is performed by graphics engine 138. Alternatively, CPU 130 just calculates new corners of the side panels and their projections onto the view plane. Once the side panels are in place, CPU 130 proceeds to block 306.

At block 306, the four corner panels are moved to rejoin the side panels. When the side panels are folded, the corner panels are unattached to their adjacent side panels except at one point where the corner panel touches its two adjacent side panels and the focus panel. Since the angle of the corner panel at a touching corner is a right angle and the angle between the edges of the previously adjacent two side panels is no longer a right angle, the corner panel is sheared so that the touching corner has an angle equal to the angle formed by the edges of the two adjacent side panels. An example of this is shown in FIG. 5, where side panel edges 222 and 224 which define angle A at touching point 220.

Once CPU 130 shears the corner panel, CPU 130 the rotates the corner panel, and then folds it down to rejoin the two adjacent side panels. Of course, in some embodiments, the shearing, rotation and folding steps might be performed in a different order. Depending on the particular fold angles of its adjacent side panels, the corner panel might be folded once to rejoin with one side panel, and then folded along the rejoined edge to rejoin the other side panel edge.

With the side panels continuous with the focus panel after folding and the corner panels continuous with the side panels after folding, a continuous folded surface in 3D containing the layout of the full image within the solid angle of the display surface is created.

At block 307, the 3D folded surface embodying the full image is projected onto the view plane. Because the side panels and corner panels have been folded at an angle to the z=0 plane, their perspective projections will be smaller than if they were viewed head on, and the detail of the image get smaller further from the focus panel.

At block 308, CPU 130 renders each of the focus, side and corner panels. A panel is rendered by identifying the bounds of the panel's projection onto the display surface, identifying the pixels of the display device which are within those bounds, identifying the bounds of the panel on the original full image, mapping the pixels of the display device onto rendering points of the original full image using the transformations calculated for the panel, determining pixel colors for each rendering point on the original full image, and then assigning those pixel colors to pixels of the display device. Because of the placement of the focus panel and the display surface in the 3D space, the transformations for the focus panel will result in a denser set of rendering points on the focus panel of the full image than the density of rendering points near the far edges of the side or corner panels (which are farther away from the viewpoint in the 3D space). Consequently, the focus panel will appear in finer detail, and since the panels are flat and continuous in the 3D space, context information is preserved. Because the panels are flat, the computation of the transforms is simple and the resulting image remains discernable. For improved rendering speed, where the image is text, the text within the side and corner panels could be greeked, either all the time or just during image movements. If greeking is used, the text in the focus panels is rendered in the font for that text, but the text within the side and corner panels is rendered in a greeked font. In a greeked font, a line of text is rendered as a single line.

If the objects of the full image which call on specific panels have been identified, then all objects which don't appear in whole or part on a given panel can be removed from the full image when that panel is being rendered.

After rendering the image, in some embodiments, CPU 130 perform one or more optional steps, shown by blocks 309, 310 and 311. At block 309, the side and corner panels are shaded to direct the viewer's attention to the focus panel while still keeping image portions on the side and corner panels visible. At block 310, CPU 130 adds border lines around the panels if desired. Alternatively, CPU 130 only adds border lines around the focus panel.

At block 311, if frame buffers are used, they are swapped here. Frame buffers are used where manipulating the image as it is being displayed would be undesirable. In such as case, the image is rendered to one frame buffer which is not the frame buffer being displayed, that frame buffer is swapped to become the current display. Another frame buffer is then used form rendering of subsequent images.

At block 312, CPU 130 exits the program if some predetermined exit condition is met, otherwise it proceeds to block 313. At block 313, CPU 130 checks for a movement command, either moving the image relative to the focus panel (a pan), or moving the viewpoint in and out (a zoom), and in embodiments where it is allowed, CPU 130 checks for a viewpoint movement command. If a movement command has not been entered, CPU 130 moves back to block 312, otherwise it loops back to block 300 to create a new display based on the movement command.

Figure 7:
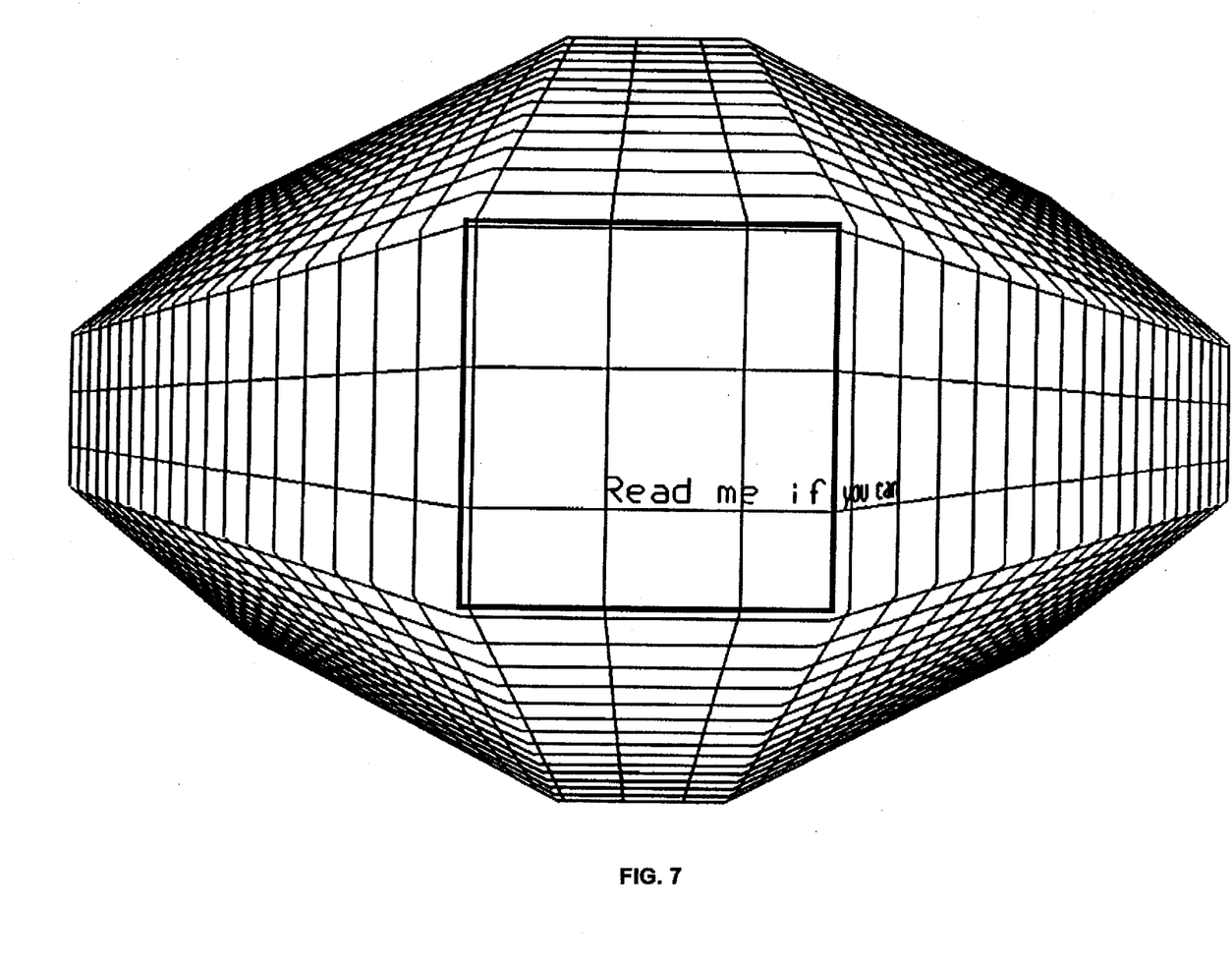
FIG. 7 is a perspective sheet substitute image for a full image which is a text document with one sentence and a uniform grid.
Figure 8:
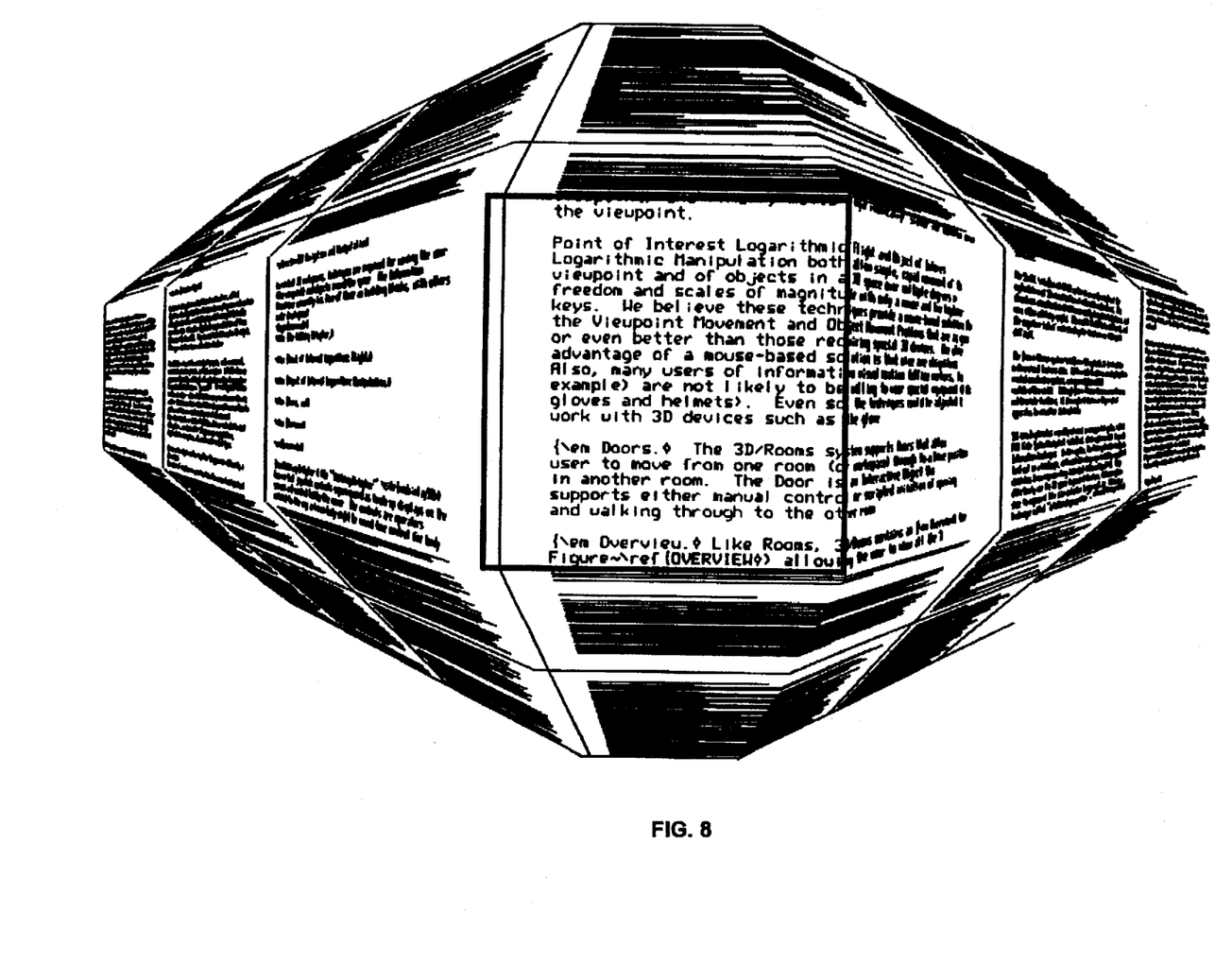
FIG. 8 is a perspective sheet substitute image for a full image which is a text document of several pages.

FIGS. 7 and 8 are examples of substitute images which are perspective sheets. The full image in FIG. 7 is a uniform grid with one sentence "Read me if you can." roughly in the center of the image. FIG. 7 illustrates, with its grid, how the image is shaped over each panel. The full image in FIG. 8 is a 17-page document in a six by three page array. In rendering the display of FIG. 8, as explained above in block 308 (FIG. 6), a simplified image having only one page is used for rendering the focus panel, while the left side panel can use a simplified image of three pages. The rendering for the other panels is similarly simplified.

The above description is illustrative and not restrictive. Many variations of the invention will become apparent to those of skill in the art upon review of this disclosure.

For example, a "display device" or display system, as used herein, could be a computer monitor, printer, or the like, although computer monitors are more suitable for interactive image display. A display system might also include an image processor or other computer system for specialized processing of an image before display. A display device might also be a device which behaves as if it displayed images but does not actually display the images. For example, a facsimile machine might manipulate images much the same manner as a computer display, but doesn't necessarily display an image, instead providing the image to another system which does display the provided image.

The scope of the invention should, therefore, be determined not with reference to the above description, but instead should be determined with reference to the appended claims along with their full scope of equivalents.

An appendix, listing source code for a specific embodiment of a perspective sheet display system is included in the application.

What is claimed is:

1. A method for presenting an interactive navigation of an image where context and detail information are preserved even when the image contains too much detail to be displayed all at once on a display surface, the method comprising the steps of:

a) defining a display extent on the display surface within which extent the image is to be displayed;

b) defining a 3-D space and a viewpoint in the 3-D space;

c) accepting user input to determine an extent and a position of a focus panel in the 3-D space wherein said focus panel is a panel positioned within boundaries of a representation of the display surface;

d) calculating a transform matrix for each of said focus panel, four edge panels and four corner panels, wherein an edge panel is a rectangle in the 3-D space with one edge coincident with the focus panel and an opposite edge coincident with an edge of the display extent and wherein a corner panel is a parallelogram in the 3-D space with two adjacent edges coincident with edges of two edge panels, thereby forming a continuous, nine-panel surface in the 3-D space with a transformation matrix for a panel defining a mapping of points on the image to points on the nine-panel surface;

wherein calculating the transform matrix for each of said four corner panels comprises the steps of:

(1) calculating a shearing transform of a corner panel from a rectangle to a quadrilateral, said shearing transform resulting in an angle between side edges of said corner panel equal to a fitting angle for said quadrilateral, wherein said fitting angle is an angle formed by edges of the two side panels adjacent to the corner panel for which the shearing transform is calculated; and (2) calculating a rotation transform of the quadrilateral in said layout plane, the rotation transform being a transform of a rotation by a rotation angle which would rotate the quadrilateral into alignment with the two side panels;

e) rendering a display image of the continuous, nine-panel surface from the viewpoint using the transformation matrices calculated in step d), the step of rendering using as its input a plurality of object representations providing the context and detail information; and f) repeating at least steps c), d) and e) in real-time to provide interactive navigation of the image by a user inputting the user input.

2. The method of claim 1, wherein said plurality of object representations are text characters, lines of characters, and pages of lines, and the image is a document.

3. The method of claim 1, wherein the plurality of object representations are nodes and lines, and the image is a map.

4. The method of claim 1, wherein a prerendering resolution of objects represented in said side panels is lower than a prerendering resolution of objects represented in said focus panel.

5. The method of claim 4, wherein the image is a text document and said lower resolution is provided by using greeked text for text in said side panels.

6. The method of claim 1, said step of rendering a display image comprises steps of:

identifying which object representations are visible on which panels; and rendering object representations for particular panels, eliminating object representations in any particular panel rendering where an object representation is wholly unrepresented in the particular panel.

7. The method of claim 1, further comprising the steps of:

accepting movement commands;

repositioning said viewpoint and said extent in said 3-D space according to said movement commands;

adjusting said transforms as necessary to keep said side panels in view from said viewpoint; and rerendering said focus panel, side panels and corner panels based on said adjusted transforms and said repositioned extent.

8. The method of claim 7, wherein said step of rerendering is timed to be completed in a constant time.

9. The method of claim 7, wherein said step of rerendering is timed to be completed in a time proportional to a distance on a full image between positions of said full image relative to said focus panel before and after said step of repositioning.

* * * * *